(12) United States Patent
Commins (10) Patent No.: US 7,621,085 B2
(45) Date of Patent: Nov. 24, 2009

(54) RACHETING TAKE-UP DEVICE

(76) Inventor: Alfred D. Commins, 91 Douglas Rd., Friday Harbor, WA (US) 98250

( * ) Notice: Subject to any disclaimer, the term of this patent is extended or adjusted under 35 U.S.C. 154(b) by 494 days.

(21) Appl. No.: 11/325,616

(22) Filed: Jan. 3, 2006

(65) Prior Publication Data

US 2006/0156657 A1    Jul. 20, 2006

Related U.S. Application Data (60) Provisional application No. 60/641,120, filed on Jan. 3, 2005.

(51) Int. Cl.
    *E02D 27/00*    (2006.01)
(52) U.S. Cl. .................. 52/293.3; 52/223.13; 52/295; 411/536
(58) Field of Classification Search .............. 52/223.13, 52/223.14, 295, 293.3, 698, 23; 411/536; 267/64.12; 188/300
    See application file for complete search history.

(56) References Cited

U.S. PATENT DOCUMENTS

| 811,035 | A | 1/1906 | Childester |
| 1,746,978 | A | 2/1930 | Winkler |
| 4,321,776 | A | 3/1982 | Delight |
| RE31,713 | E | 10/1984 | Erikson et al. |
| 4,479,747 | A | 10/1984 | Pagel |
| 4,708,555 | A | 11/1987 | Terry |
| 4,812,096 | A | 3/1989 | Peterson |
| 4,896,985 | A | 1/1990 | Commins |
| 5,081,811 | A | 1/1992 | Sasaki |
| 5,168,681 | A | 12/1992 | Ayrapetyan |
| 5,180,268 | A | 1/1993 | Richardson |
| 5,340,258 | A | 8/1994 | Simon |
| 5,364,214 | A | 11/1994 | Fazekas |
| 5,522,688 | A | 6/1996 | Reh |
| 5,535,561 | A | 7/1996 | Schuyler |
| 5,540,530 | A | 7/1996 | Fazekas |
| 5,815,999 | A | 10/1998 | Williams |
| 5,839,321 | A | 11/1998 | Siemons |
| 5,987,828 | A | 11/1999 | Hardy |
| 6,007,286 | A | 12/1999 | Toyota et al. |
| 6,019,556 | A | 2/2000 | Hess |
| 6,161,350 | A | 12/2000 | Espinosa |

(Continued)

OTHER PUBLICATIONS

Anchor Tiedown System Multi-Story Holdown Applications, Simpson Strong-Tie, 24 pages, Mar. 2002.

(Continued)

*Primary Examiner*—Jeanette E Chapman
*Assistant Examiner*—Daniel Kenny
(74) *Attorney, Agent, or Firm*—Pate Pierce & Baird (57) ABSTRACT

An apparatus for taking-up slack in a building hold-down system. The apparatus may include a base having a tubular shape, a slide having a tubular shape and a threadless interior surface, a locking member, and a biasing member. The slide may be sized and positioned to translate within the base. The locking member may be positioned between the base and the slide to permit translation of the base with respect to the slide to cause expansion and resist translation of the base with respect to the slide to cause contraction. The biasing member may urge translation of the base with respect to the slide in the direction causing expansion.

17 Claims, 7 Drawing Sheets

U.S. PATENT DOCUMENTS 6,390,747 B1   5/2002   Commins
6,415,673 B1   7/2002   Erikson et al.
6,494,654 B2   12/2002  Espinosa
6,513,290 B2   2/2003   Leek
6,585,469 B2   7/2003   Commins

OTHER PUBLICATIONS

Zone Four Innovative Engineered Solutions, Zone Four, 24 pages, 2000.

RACHETING TAKE-UP DEVICE

RELATED APPLICATIONS

This application claims the benefit of co-pending U.S. Provisional Patent Application Ser. No. 60/641,120, filed on Jan. 3, 2005 for RACHETING TAKE-UP WASHER.

BACKGROUND

1. The Field of the Invention

This invention pertains to building construction, and, more particularly, to novel methods and apparatus for anchoring building walls to foundations and lower floors thereof. The invention provides an automatic adjusting mechanism to remove slack in a hold-down system caused by wood shrinkage over time or wood crushing caused by earthquakes.

2. The Background Art

Strong winds and earthquakes subject walls and others elements of a building to tremendous forces. If these forces are not distributed to the proper elements or structures capable of withstanding such forces, the building may be torn apart. Foundations are often the strongest element of a building. Securely tying the walls of a building to the foundation greatly improves structural performance during periods of strong wind or earthquake. Securement promotes single-body motion and limits whiplash amplification that often results in structural failure.

Under such extreme conditions, a building may be violently loaded or shaken both vertically and back and forth in a lateral (side to side) direction. If a shear wall is tightly restrained at its base, loads may be smoothly transferred to the foundation. The loads may then be resolved in the foundation, where they appear as tension and compression forces.

Buildings are often composed of long walls, (walls with a length greater than the height) and short walls (walls that have a length shorter than the height). The tendency for a wall to lift vertically off a foundation is inversely proportional to the length of the wall. Tall, narrow shear walls, which may be found in nearly all homes, act as lever arms and may magnify an imposed load. In certain instances, the actual load on the securement system may be magnified to several times the originally imposed load.

Wall securement may reduce or prevent lateral and vertical motion between the walls and the foundation. Additionally, it may be necessary to support the wall against shear forces that would tend to distort the wall's general rectangular shape. Building codes often require external and load bearing walls to be shear resistant by providing a plywood plane to support shear forces that may be imposed on the wall. Many times, building codes also require lateral and vertical securement of a wall to the foundation. Lateral and vertical securement may be accomplished by employing hold-downs, also referred to as tie-downs.

Wood products change in dimension as moisture content changes. Accordingly, floor systems using solid sawn joists typically shrink approximately five percent across the grain. Under certain conditions, floor systems have been known to shrink six and one-half percent within a year. This shrinkage is typically part of the overall process and condition called "settling," which may also include other changes such as settling of foundations.

In typical practice, hold-down systems may include a threaded rod or an anchored strap capturing the base plate or sill plate of a wall (i.e., the bottom, horizontal member above which the studs extend vertically). Over time (e.g., months, years) wood loses moisture, shrinks, and the building settles. Threaded-rod-type anchors become loose. Strap-type anchors buckle, if positively engaged, and become loaded in compression, or the like. Moreover, under a dynamic load, such as an earthquake or high wind conditions, wood crushes or collapses. Thus, gaps permitting undesirable motion of the walls with respect to the foundation may continue to increase during a catastrophic event.

Accordingly, current hold-down systems do not provide a solution for wood shrinkage, wood crushing, and other settling issues. As a result, with the passage of time, the walls of a building may be able to move significant distances before engaging the hold-down systems designed to secure them in place. This delay in engagement can result in a fifty percent to seventy percent loss in lateral, load-bearing capacity. Neither shrinkage nor crushing are well accommodated or otherwise resolved in currently available systems. These problems lead to a significant reduction in the lateral, load-bearing capacity of shearwalls.

What is needed is a hold-down or tie-down system accommodating shrinkage of building materials. Such a hold-down system may significantly improve the strength of shear walls subject to shrinkage of constituent materials.

BRIEF SUMMARY OF THE INVENTION

In view of the foregoing, in accordance with the invention as embodied and broadly described herein, a method and apparatus are disclosed in one embodiment of the present invention as including a take-up device comprising a base, a slide, one or more locking members, and a biasing member. In operation, a locking member may be positioned to permit translation of the base with respect to the slide in one direction and resist translation of the base with respect to the slide in an opposite direction. The biasing member may be positioned and loaded to urge translation of the base with respect to the slide in a direction permitted by the locking member. Accordingly, a take-up device 10 may provide a unidirectional rachet biased toward expansion, while resisting contraction.

In selected embodiments, the base and slide may both be tubular structures. In certain embodiments, a slide may be sized and positioned to translate within abase. The interior surface of a base may include various partial receiving volumes. Each of the partial receiving volumes may have a cross section selected to receive only partially a locking member therein. The exterior surface of a slide may include one or more full receiving volumes. Each of the full receiving volumes may having a cross section selected to fully receive a locking member therein.

When contained within a full receiving volume and an adjacent partial receiving volume, a locking member may be biased to enter the partial receiving volume. So configured, the locking member may cause a structural interference between itself, the partial receiving volume, and the full receiving volume during translation of the base with respect the slide in a first direction. However, the full receiving volume may be shaped to remove the locking member from the partial receiving volume during translation of the base with respect the slide in a second direction, opposite the first direction.

In selected embodiments, the biasing member may surround the slide. For example, the biasing member may comprise a coil spring of substantially exclusively cylindrical shape positioned to encircle the slide. A keeper positioned at the end of the slide opposite the base may extend in a radial direction some distance further than the rest of the slide. Similarly, the base may extend in the radial direction some distance from the slide. Accordingly, the coil spring may act on the keeper and one end of the base to urge the desired translation.

In selected embodiments, a take-up device in accordance with the present invention may include an aperture extending therethrough. The aperture may be sized as a clearance hole for receiving an anchor. Accordingly, during installation, a take-up device may be placed over an anchor to rest on a structural member such as a sill plate, hold-down bracket, cross member extending between support members, a bearing plate for distributing loads, or the like.

Once a take-up device is positioned over an anchor, a fastener may be installed. The take-up device may then transfer to the fastener any loads imposed by the structural member. The fastener may transfer such loads to the anchor, which, in turn, may transfer the same to a foundation for resolution.

In selected embodiments, it may be desirable to maintain a take-up device in a contracted configuration before and during installation. Accordingly, in selected embodiments, a take-up device may include a trigger. A trigger may resist the biasing imposed by the biasing member until installation is complete. Once the trigger is released, a take-up device expands to fill or consume any increase in the distance between the fastener and the structural member. In certain embodiments, a take up device, in accordance with the present invention, may expand up to several inches in length. If desired, an extension stop may be included to limit the amount of expansion experienced by a take-up device. For example, an expansion stop may stop expansion before the biasing member urges separation of the base and slide.

BRIEF DESCRIPTION OF THE DRAWINGS

The foregoing features of the present invention will become more fully apparent from the following description and appended claims, taken in conjunction with the accompanying drawings. These drawings depict only typical embodiments of the invention and are, therefore, not to be considered limiting of its scope. The invention will be described with additional specificity and detail through use of the accompanying drawings in which:

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
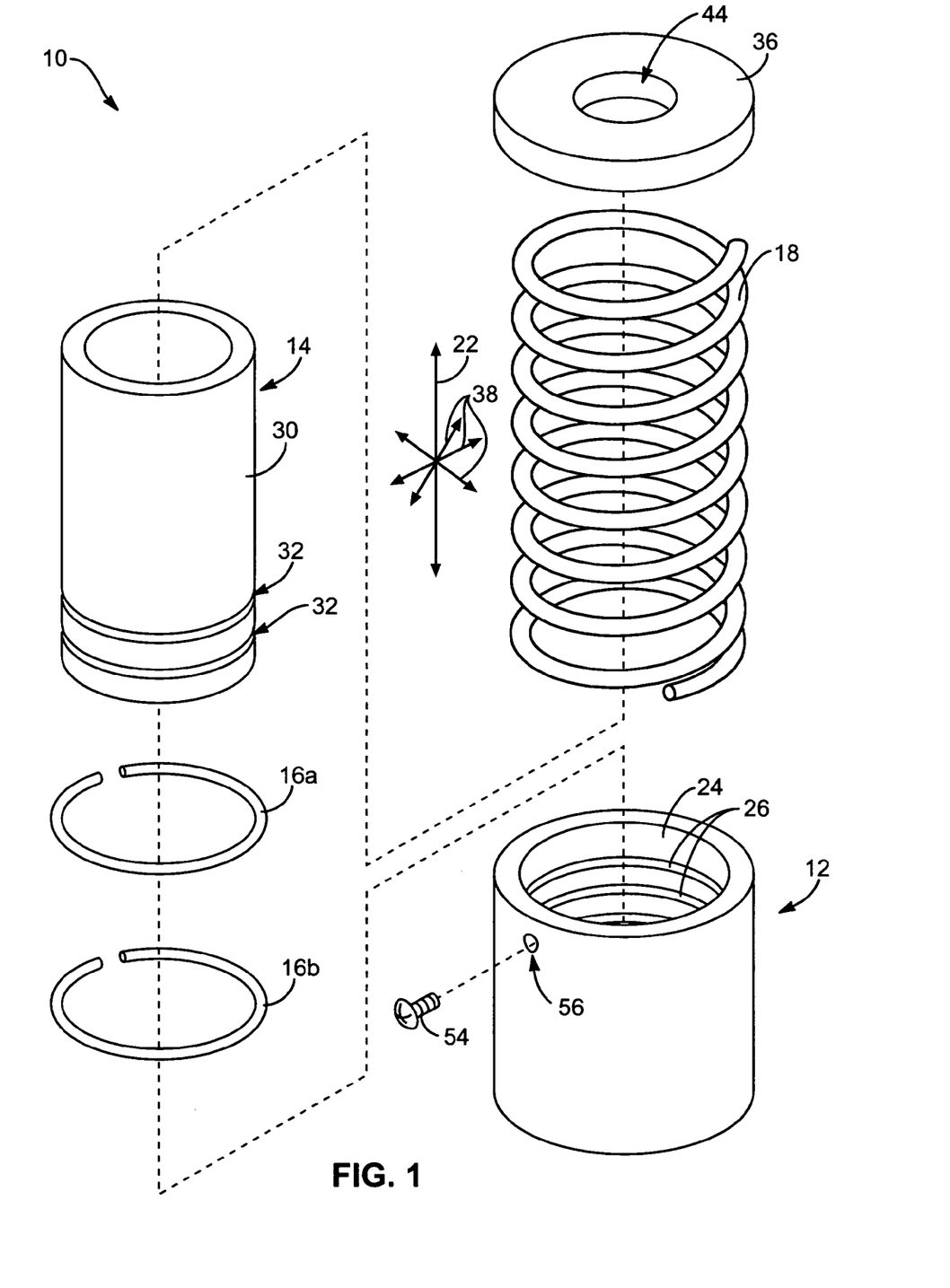
FIG. 1 is an exploded, perspective view of one embodiment of a take-up device in accordance with the present invention.
Figure 2:
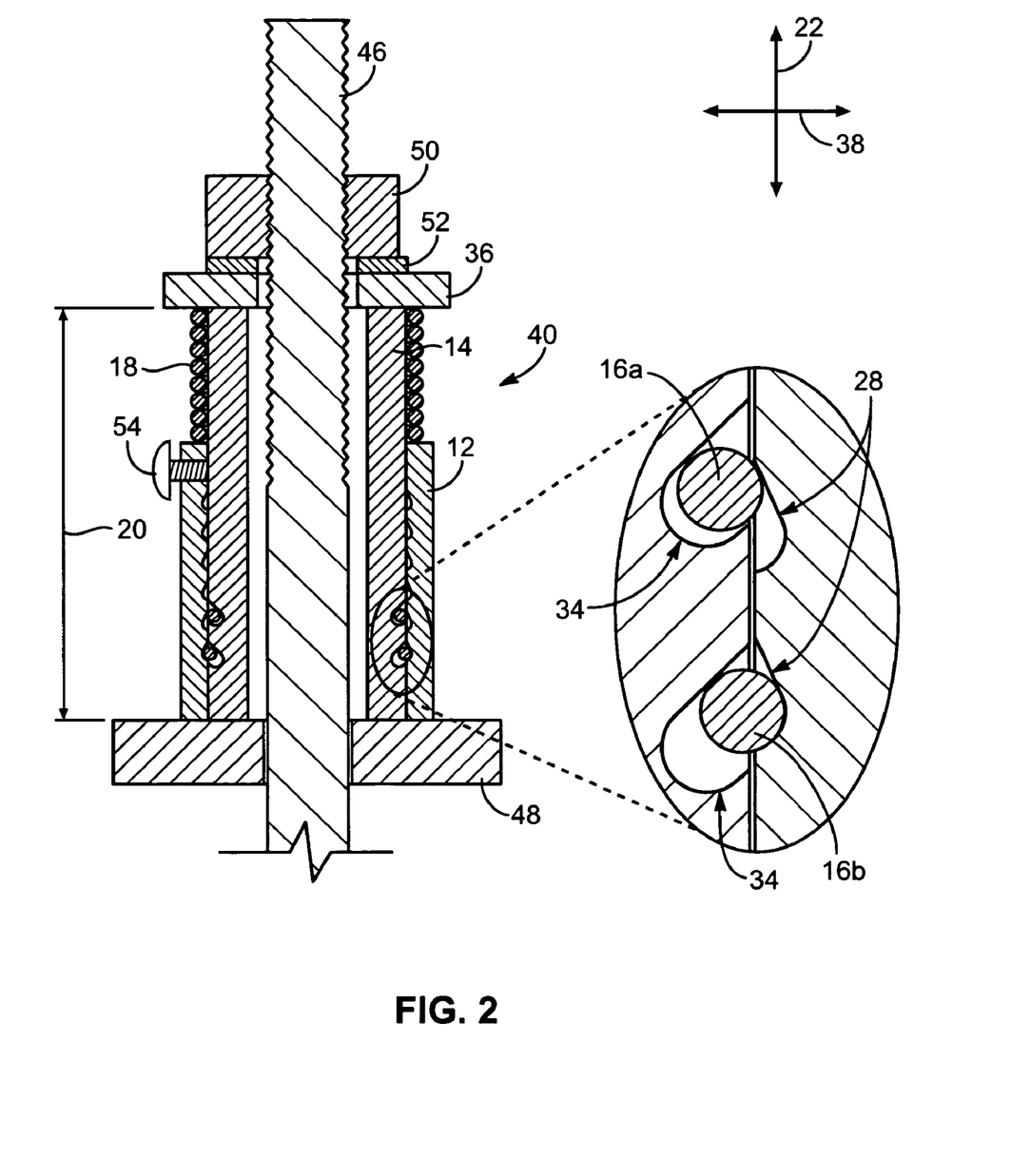
FIG. 2 is a cross-sectional, side view of the take-up device of FIG. 1 assembled in an unexpanded (contracted, loaded) configuration and installed on an anchor in accordance with the present invention.
Figure 3:
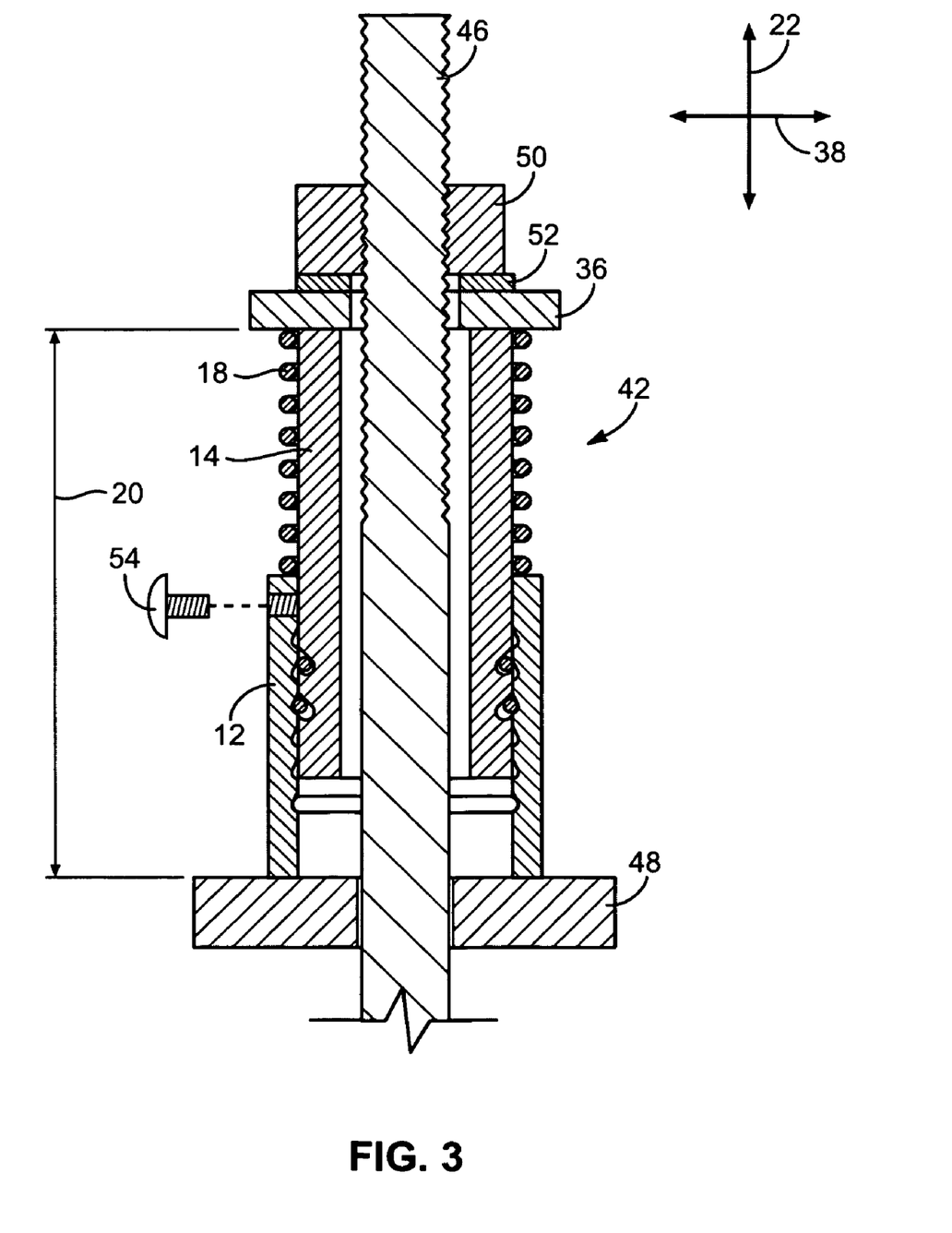
FIG. 3 is a cross-sectional, side view of the take-up device of FIG. 1 assembled in a partially expanded configuration and installed on an anchor in accordance with the present invention.

Referring to FIGS. 1-3, in selected embodiments, a take-up device 10 in accordance with the present invention may include a base 12, a slide 14, one or more locking members 16, and a biasing member 18. In operation, a locking member 16 may be positioned between the base 12 and the slide 14 to control relative motion therebetween. For example, a locking member 16 may permit translation of the base 12 with respect to the slide 14 in one direction and resist translation of the base 12 with respect to the slide 14 in an opposite direction.

A biasing member 18 may urge translation of the base 12 with respect to the slide 14 in a direction permitted by the locking member 16. Accordingly, a take-up device 10 may provide a unidirectional rachet biased toward expansion (i.e., an increase in length 20 in an axial direction 22), while resisting contraction (i.e., a decrease in length 20 in the axial direction 22). Thus, a take-up device 10 in accordance with the present invention, under the urging of the biasing member 18, may expand to fill gaps caused by shrinkage or settling, yet resist contraction with sufficient force to accommodate the loads that may be imposed on the components of a hold-down system.

In certain embodiments, a base 12 may be formed to have a tubular shape. For example, the base 12 may comprise a hollow cylinder. A slide 14 may be sized and positioned to translate within a base 12. Accordingly, a slide 14 may have a shape corresponding to that of the base 12. Thus, in certain embodiments, a slide 14 may also have a tubular shape (e.g., comprise a hollow cylinder).

A base 12 or slide 14 in accordance with the present invention may be formed of any suitable material. Characteristics that may be considered when selecting a material may include cost, availability, machinability, formability, shear strength, tensile strength, compressive strength, impact resistance, corrosion resistence, creep resistance, or the like. In selected embodiments, suitable materials may include metals, metal alloys, polymers, reinforced polymers, and the like.

In certain embodiments, a base 12 may comprise a hollow cylinder having a threadless interior surface 24. Accordingly, the base 12 may encircle or surround an anchor of a hold-down system without directly engaging (e.g., threadedly engaging) that anchor. In selected embodiments, the interior surface 24 may include various partial receiving volumes 26 distributed thereacross. Each of the partial receiving volumes 26 may having a cross section 28 selected to receive only partially a locking member 16 therein.

In such embodiments, a slide 14 may comprise a hollow cylinder having a threadless exterior surface 30. The slide 14 may also encircle or surround an anchor of a hold-down system without directly engaging (e.g., threadedly engaging) that anchor. In selected embodiments, the exterior surface 30 may include one or more full receiving volumes 32. Each of the full receiving volumes 32 may have a cross section 34 selected to receive fully a locking member 16 therein.

The substantially uni-directional ratchet formed by a locking member 16, multiple partial receiving volumes 26, and a full receiving volume 32 maybe configured and function as comparable components disclosed in U.S. Pat. No. 6,161,350 issued Dec. 19, 2000 to Espinosa and entitled "FASTENER ASSEMBLY SERVING AS A PRODUCT, OR COMBINED WITH OTHER COMPONENTS AS A PRODUCT ALLOWS AUTOMATIC CONTROLLED MOVEMENTS IN ONE DIRECTION AND PREVENTS MOVEMENTS IN THE OPPOSITE DIRECTION WHEN FORCES ARE APPLIED," which is incorporated herein by reference.

For example, in certain embodiments, each of the locking members 16 may comprise an annulus. The annulus may be discontinuous to permit changes in circumference. Each locking member 16 may have a circumference in a neutral, unloaded position selected such that, when it is contained within a full receiving volume 32 of a slide 14 and an adjacent partial receiving volume 26 of a base 12, the locking member 16 may be biased to enter the partial receiving volume 26.

So configured, the locking member 16 may cause a structural interference between itself, the partial receiving volume 26, and the full receiving volume 32 during translation of the base 12 with respect the slide 14 in a first direction aligned with the axial direction 20. However, the full receiving volume 32 may be shaped to remove the locking member 16 from the partial receiving volume 26 during translation of the base 12 with respect the slide 14 in a second direction, opposite the first direction.

Due to the individualized nature of the partial receiving volumes 26, 32, the ratcheting action of a base 12 with respect to a slide 14 may include some amount of backlash. That is, as a locking member 16 transitions from one location of structural interference (e.g., partial receiving volume 26) to another, there maybe no immediate restraint against contraction. Accordingly, during such transitions, a locking member 16 may retreat to a previous location of structural interference before contraction may be resisted.

Embodiments in accordance with the present invention may include any suitable arrangement for minimizing backlash. For example, in selected embodiments, the frequency at which locations of structural interference are encountered may be increased. Accordingly, when backlash occurs, it may be minimal. This may be done in various manners. In one embodiment, the number of locking members 16 and corresponding full receiving volumes 32 may increased.

For example, two locking members 16a, 16b and receiving volumes 32 may be included. The distance between the fill receiving volumes 32 may be different from the distance between the partial receiving volumes 26. Accordingly, the number of locations of structural interference may be doubled.

Alternatively, or in combination therewith, the number of partial receiving volumes 26 may be increased. In one embodiment, the partial receiving volumes 26 maybe positioned one directly after another. In such a manner, as a locking member 16 exits one partial receiving volume 26, it may substantially immediately enter another. Thus, the amount of backlash may be decreased.

In selected embodiments, the biasing member 18 may be positioned to urge translation of the base 12 with respect to the slide 14 in a direction permitted by the locking member 16. In certain embodiments, a base 12 or slide 14 may include a shoulder, ledge, or the like providing a bearing surface for the biasing member 18.

For example, in one embodiment, a slide 14 may include a keeper 36. The keeper 36 may be formed as part of the slide 14. That is, in certain embodiments, the keeper 36 may be machined, cast, molded, or otherwise formed as a single, seamless unit with the rest of the slide 14. Alternatively, the keeper 36 may be a separate component connected (e.g., welded, bolted, bonded) to the rest of the slide 14 during a manufacturing process.

In selected embodiments, the biasing member 18 may surround the slide 14. For example, the biasing member 18 may comprise a coil spring of substantially exclusively cylindrical shape positioned to encircle the slide 14. A keeper 36 positioned at the end of the slide 14 opposite the base 12 may extend in a radial direction 38 some distance further that the rest of the slide 14. Similarly, the base 12 may extend in the radial direction 38 some distance from the slide 14. Accordingly, the coil spring 18 may act on the keeper 36 and one end of the base 12 to urge the desired translation.

A biasing member 18 may change in size as it induces translation between abase 12 and a slide 14. For example, a coil spring 18 may have a greater diameter when in a compressed (contracted) position 40 than it does in an expanded position 42. Thus, in embodiments where the biasing member 18 surrounds the slide 14, the diameter of the slide 14 in the radial direction 38 may be selected to accommodate the maximum diameter change expected from the biasing member 18.

In selected embodiments, a keeper 36 may include an aperture 44 extending therethrough. The aperture 44 may be sized as a clearance hole for receiving an anchor 46. Accordingly, during installation, a take-up device 10 may be placed over an anchor 46 to rest on a structural member 48. A structural member 48 may be a sill plate, a hold-down bracket, a cross member extending between support members (e.g., studs, joists), a bearing plate for distributing loads over one of the foregoing, or the like.

Once a take-up device 10 is positioned over an anchor 46, a fastener 50 may be installed. The take-up device 10 may then transfer to the fastener 50 any loads imposed by the structural member 48. The fastener 50 may transfer such loads to the anchor 46, which, in turn, may transfer the same to a foundation for resolution. In embodiments where the anchor 46 comprises a rod with a threaded end, the fastener 50 may comprise a nut. A washer 52 may be included as necessary or desired.

In selected embodiments, it may be desirable to maintain a take-up device 10 in a contracted configuration before and during installation. Accordingly, in selected embodiments, a take-up device 10 may include a trigger 54. A trigger 54 may resist the biasing imposed by the biasing member 18 until installation is complete (i.e., when the take-up device 10 is placed over the anchor 46 and the fastener 50 has been applied and tightened).

In one embodiment, a trigger 54 may comprise a screw 54 or bolt 54 extending through an aperture 56 in the base 12 to engage the slide 14. Once the screw 54 is removed, then the slide 14 and the base 12 may become susceptible to the urging of the biasing member 18. Accordingly, after the trigger 54 is released, the take-up device 10 may consume (fill) subsequent increases in the distance between the structural member 48 and the fastener 50.

The amount of slack that a take-up device 10 in accordance with the present invention may consume may vary from embodiment to embodiment. In general, a take-up device 10 may consume whatever changes in distance may be accommodated by the biasing member 18. That is, the base 12 and slide 14 may have any suitable length and any suitable number of receiving volumes 26, 32. Accordingly, so long as the biasing member 18 may continue to urge relative translation between the base 12 and slide 14, the take-up device 10 may continue expanding. However, given the typical scale of wood shrinkage and settling, take-up devices 10 consuming gaps from substantially zero to one or two inches are generally adequate.

In selected embodiments, it may be desirable to limit the amount of expansion experienced by a take-up device 10. For example, it may be desirable to stop expansion before the biasing member 18 can cause actual separation of the base 12 and slide 14. Accordingly, a take-up device 10 in accordance with the present invention may include an extension stop. In certain embodiments, an extension stop may comprise a mechanical interference once a base 12 has traveled a selected distance along a slide 14. In other embodiments, an extension stop may be formed by selecting a biasing member 18 incapable of urging translation of a base 12 with respect to a slide 14 past a particular expansion point.

In selected embodiments, at least a portion of the interior surface of a slide 14 or a keeper 36 may be threaded to engage an anchor 46. Accordingly, the slide 14 may be axially fixed to travel with the anchor 46. The biasing member 18 may urge travel of the base 12 with respect to the slide 14. Accordingly, the device 10 may continue to consume slack in the hold-down system. In such embodiments, the fastener 50 may be omitted.

Figure 4:
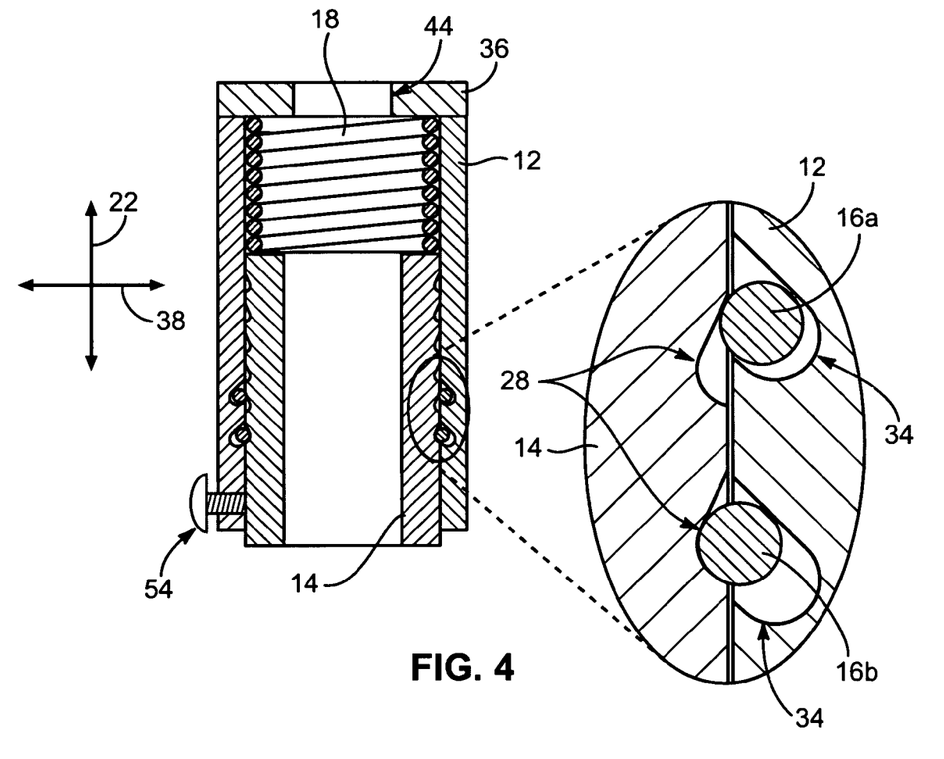
FIG. 4 is a cross-sectional, side view of an alternative embodiment of a take-up device in an unexpanded (contracted, loaded) configuration in accordance with the present invention.

Referring to FIG. 4, the positioning of a biasing member 18 may vary from embodiment to embodiment. For example, in selected embodiments, the biasing member 18 may be positioned in the interior of the take-up device 10. In one such embodiment, a keeper 36 may be included as part of the base 12. Accordingly, the biasing member 18 may act on the keeper 36 and one end of the slide 14 to urge the desired translation of the base 12 with respect to the slide 14.

Similarly, the positioning of the receiving volumes 26, 32 may vary from embodiment to embodiment. For example, in selected embodiments, the full receiving volumes 32 may be included as part of the base 12. Accordingly, the partial receiving volumes 26 may be included as part of the slide 14.

Figure 5:
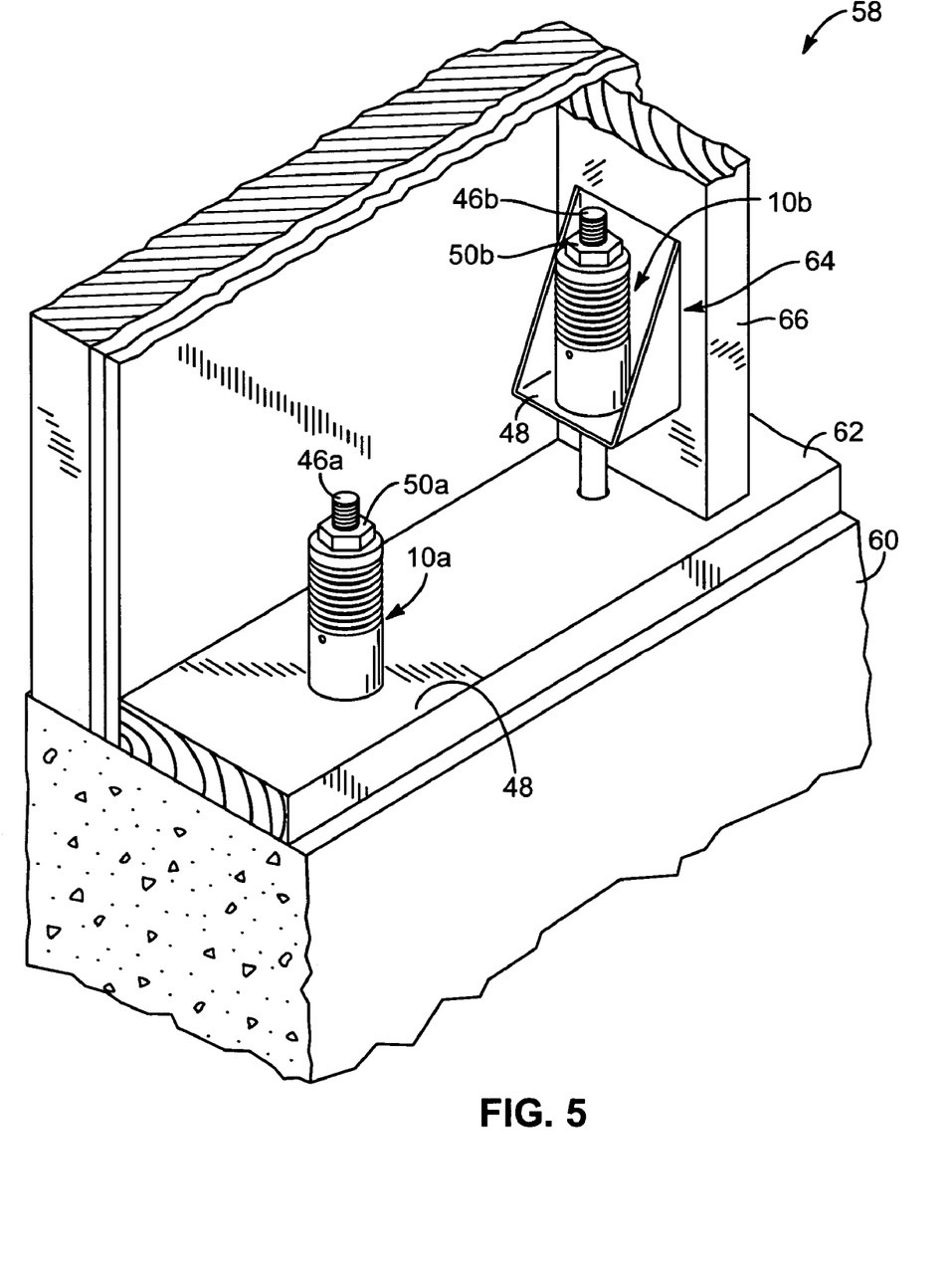
FIG. 5 is a partial perspective view of a shear wall anchored in accordance with the present invention using one take-up device directly applied to the sill plate and another take-up device applied to a bracket secured to a stud.

Referring to FIG. 5, a shear wall 58 in accordance with the present invention may comprise an engineered assembly of lumber, plywood, oriented strand board (OSB), nails, attachment hardware, or the like. Shear walls 58 in accordance with the present invention may be designed to resist in-plane wind forces, inertial forces generated by seismic accelerations, and the like. Accordingly, as a load is applied to a shear wall 58, the shear wall 58 may tend to move away and induce a rotational force or moment in the shear wall 58. This moment may tend to lift one corner of the wall 58 off a foundation 60 or support 60. Accordingly, in selected embodiments in accordance with the present invention, the wall 58 may be retained by one or more anchors 46a, 46b extending from the foundation 60.

For example, in certain embodiments, an anchor 46a may secure a structural member 48 comprising a sill plate 62 directly to a foundation 60. A take-up device 10a in accordance with the present invention may be positioned between the sill plate 62 and a fastener 50a to consume any slack that may develop due to shrinkage of the sill plate 62, settling of the shear wall 58, or the like. Depending on the magnitude of the load to be applied to the anchor 46a, a bearing plate (not shown) may be installed between the take-up device 14 and the sill plate 62. A bearing plate may distribute over a greater area the loads imposed on the sill plate 62 by the take-up device 10a.

In other embodiments, a take-up device 10b in accordance with the present invention may occupy the space between a fastener 50b on an anchor 46b and a structural member 48 comprising a hold-down bracket 64. In such embodiments, the bracket 64 may be secured to a support member 66 (e.g., stud, joist, or the like). A take-up device 10b in accordance with the present invention may be positioned between the bracket 22 and a fastener 20b. Accordingly, the take-up device 10b may insure a tight connection between an anchor and the support member 66.

Figure 6:
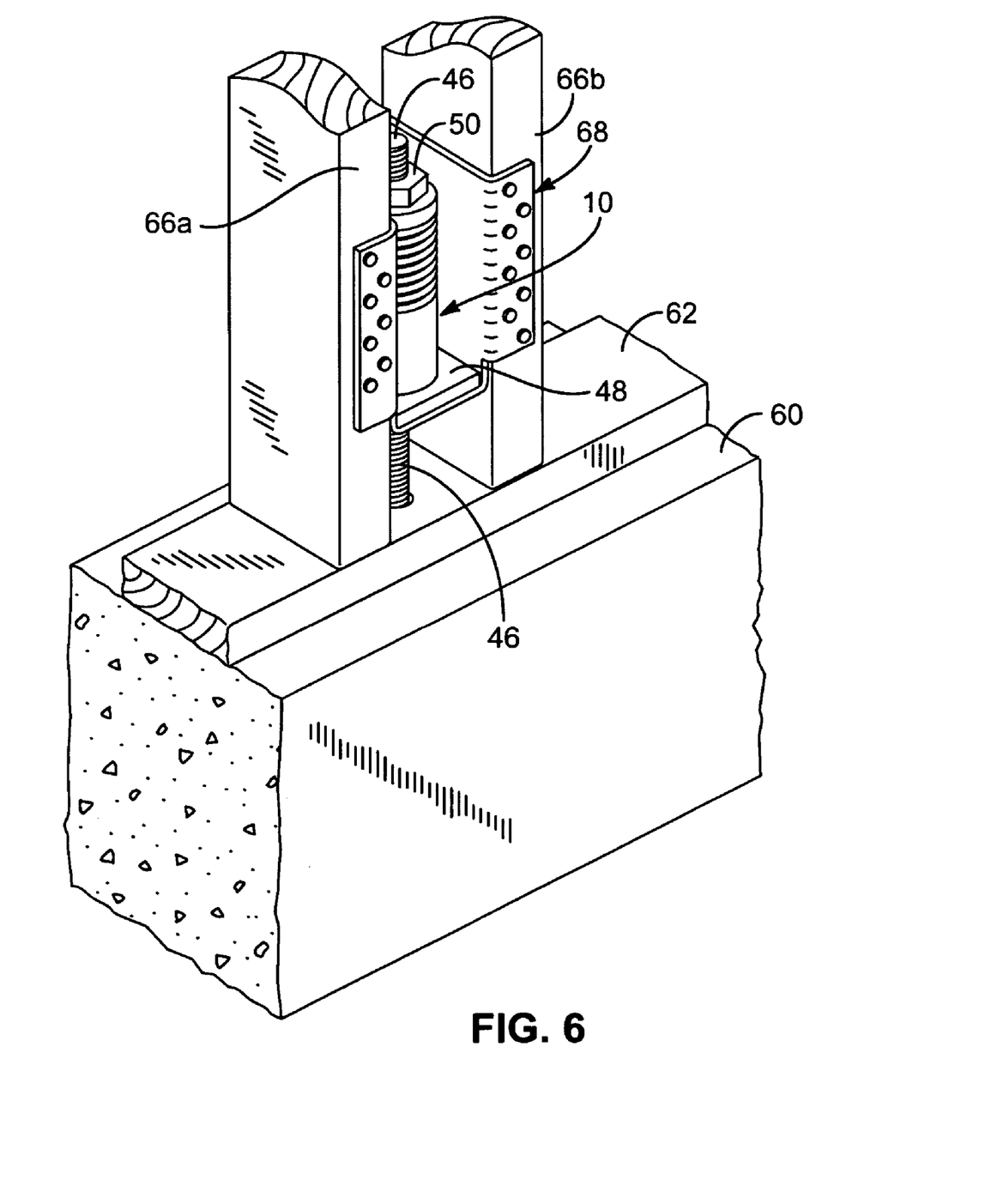
FIG. 6 is a perspective view of a take-up device in accordance with the present invention installed within a concentric, balanced, multi-stud hold-down.

Referring to FIG. 6, in certain embodiments, a take-up device 10 in accordance with the present invention may occupy the space between a fastener 50 on an anchor 46 and a structural member 48 comprising a cross member 68 extending between two support members 66a, 66b (e.g., studs, joists, or the like). For example, a take-up device 10 may be positioned on a concentric, multi-stud hold-down 68. Alternatively, a take-up device 10 maybe positioned on a cross member 68 comprising a plate formed of wood or other material.

A cross member 68 for supporting a take-up device 10 may be positioned at any suitable location. Suitable locations may include lower positions proximate a foundation 60, intermediate positions, and higher position proximate the upper extent of the support member 66a, 66b. A cross member 68 may be incorporated as part of a first story wall or an upper story wall. In selected embodiments, a cross member 68 in an upper story wall may provide the support and anchoring for the stories therebelow.

Figure 7:
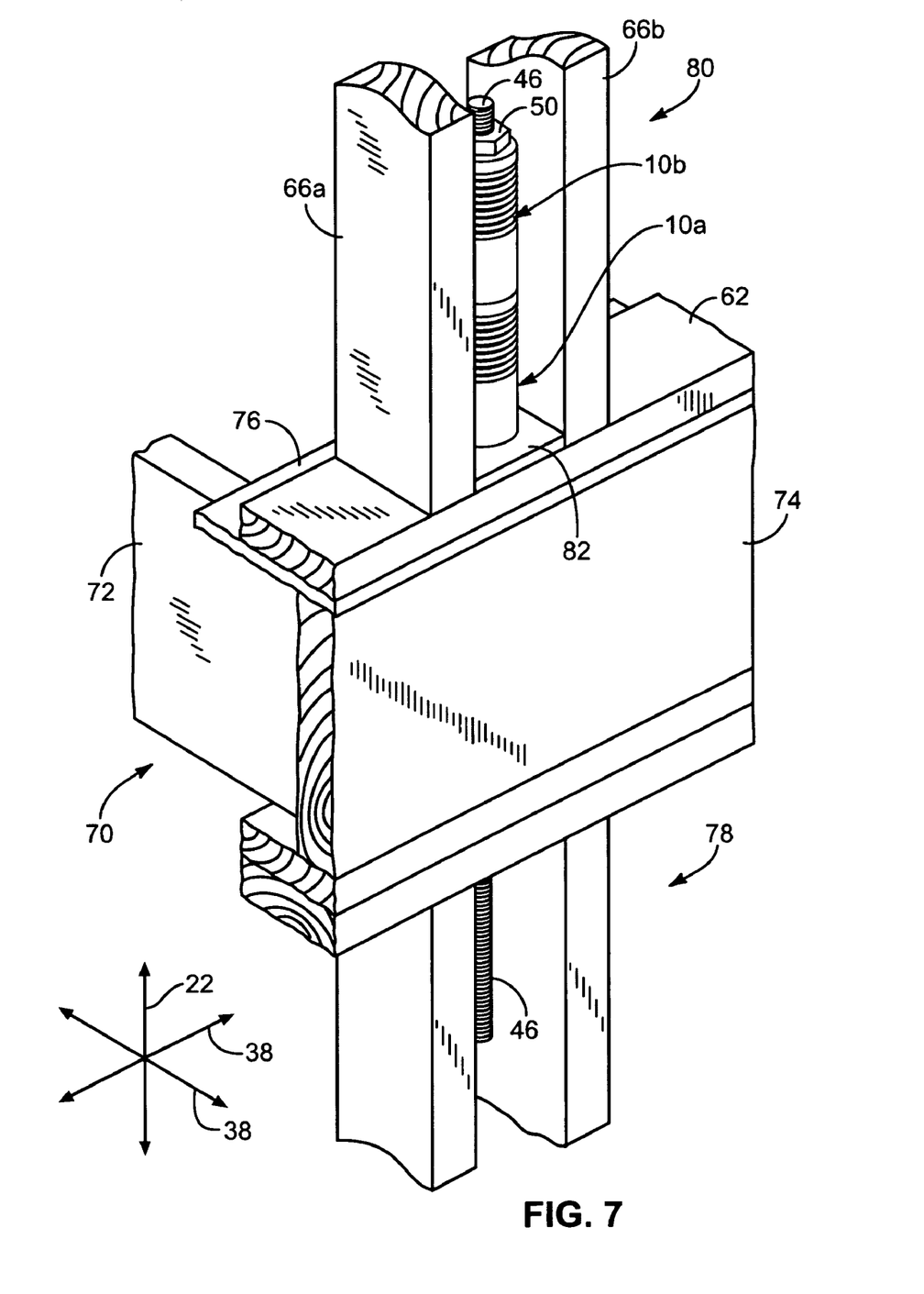
FIG. 7 is a perspective view of two take-up devices in accordance with the present invention stacked one on top of the other and positioned to accommodate shrinkage imposed on an upper story of a building.

Referring to FIG. 7, in selected embodiments, a take-up device 10 in accordance with the present invention may be applied to accommodate shrinkage and settling across a floor. For example, many buildings and residences are constructed using platform framing. This method includes building a floor platform 70 comprising trusses 72 or joists 72, headers 74, floorboards 76, and the like. This floor platform 70 is typically constructed to be supported from below by a doubleplated wall 78 (e.g., shearwall 58). An upper story wall 80 (e.g., shearwall 58) may then be constructed to be supported by the floor platform 70.

In such embodiments, an anchor bolt 46 must span a significant thickness of wood. Accordingly, a take-up device 10 configured to accommodate the shrinkage produced by such a thickness may be selected and applied to secure the upper story wall 80. If one take-up device 10 lacks the capacity to accommodate all of the shrinkage, multiple take-up devices 10a, 10b may be applied. Accordingly, a composite take-up device 10 maybe formed having a capacity equal to the sum of the capacities of the individual take-up devices 10a, 10b included therein.

In selected, embodiments, the take-up device 10 may be applied over a bearing plate 82 positioned to protect the sill plate 62 of the upper story wall 80. In other embodiments, the take-up device 10 may be applied directly to the sill plate 62. In still other embodiments, the take-up device 10 may be applied to a cross member 68 connected to two or more support members 66a, 66b of the upper story wall 80.

The present invention may be embodied in other specific forms without departing from its basic functions, features, or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
   a base having a tubular shape;
   a slide having a tubular shape and a threadless interior surface;
   at least one locking member positioned between the base and the slide to permit expansion of the apparatus and resist contraction thereof;
   the base, further comprising a plurality of partial receiving volumes, each partial receiving volume having a cross section selected to receive only partially the at least one locking member therein:
   a keeper positioned proximate the slide; and
   a biasing member pushing against the base and the keeper, the biasing member being in substantially direct contact with each, to urge expansion of the apparatus.

2. The apparatus of claim 1, wherein the biasing member comprises a coil spring of substantially exclusively cylindrical shape.

3. The apparatus of claim 2, wherein the slide further comprises a threadless exterior surface.

4. The apparatus of claim 3, wherein the exterior surface of the slide comprises at least one full receiving volume having a cross-section selected to receive fully the at least one locking member therein.

5. The apparatus of claim 4, wherein the at least one locking member comprises a discontinuous annulus.

6. The apparatus of claim 5, wherein the at least one locking member is biased to enter a partial receiving volume of the plurality of partial receiving volumes and cause a structural interference with the at least one full receiving volume during translation of the base with respect the slide corresponding to movement tending toward contraction of the apparatus.

7. The apparatus of claim 6, wherein the least one full receiving volume is shaped to remove the at least one locking member from the partial receiving volume during translation of the base with respect the slide corresponding to expansion of the apparatus.

8. The apparatus of claim 7, wherein the least one full receiving volume comprises a first full receiving volume and a second full receiving volume.

9. The apparatus of claim 8, wherein the at least one locking member comprises a first discontinuous annulus and a second discontinuous annulus corresponding the first and second full receiving volumes, respectively.

10. The apparatus of claim 9, wherein the biasing member comprises a coil spring loaded substantially exclusively in compression.

11. The apparatus of claim 1, wherein the at least one locking member comprises a first discontinuous annulus and a second discontinuous annulus.

12. The apparatus of claim 1, wherein the slide comprises a hollow cylinder having a threadless exterior surface comprising at least one full receiving volume having a cross section selected to fully receive the at least one locking member therein.

13. An assembly comprising:
   a structure comprising a foundation, a structural member, an anchor extending in a first direction from the foundation through the structural member, and a fastener engaging the anchor at a location spaced from the structural member in the first direction;
   a base encircling the anchor with at least a clearance fit at a location between the structural member and the fastener;
   a slide positioned adjacent the base and comprising a hollow cylinder having a threadless interior encircling the anchor with at least a clearance fit at a location between the structural member and the fastener;
   a locking member positioned between the base and the slide to permit axial expansion and resist axial contraction of the base and slide, both the expansion and contraction due to translation of the base with respect to the slide;
   one of the base and the slide having a first surface comprising a plurality of partial receiving volumes, each partial receiving volume having a cross section selected to receive only partially the locking member therein:
   the other of the base and the slide having a second surface having at least a clearance fit with the first surface and comprising a plurality of full receiving volumes, each full receiving volume having a cross section selected to receive the locking member therein urged thereinto by the first surface passing thereby: and
   a biasing member urging expansion by translation of the base with respect to the slide.

14. The assembly of claim 13, wherein the biasing member comprises a coil spring of substantially exclusively cylindrical shape.

15. The assembly of claim 14, wherein the base comprises a hollow cylinder having a threadless interior.

16. The assembly of claim 15, wherein the slide comprises a hollow cylinder having a threadless interior.

17. An apparatus comprising:
   at least one locking member comprising a discontinuous annulus;
   a base comprising a threadless hollow cylinder having an interior surface comprising a plurality of partial receiving volumes, each partial receiving volume having a cross section selected to receive only partially the at least one locking member therein;
   a slide comprising a threadless hollow cylinder having an exterior surface comprising at least one full receiving volume having a cross section selected to fully receive the at least one locking member therein;
   the at least one locking member positioned and biased to enter a partial receiving volume of the plurality of partial receiving volumes and cause a structural interference with the at least one full receiving volume during translation of the base with respect to the slide in a first direction;
   the base wherein the at least one full receiving volume is shaped to remove the at least one locking member from the partial receiving volume during translation of the base with respect to the slide in a second direction, opposite the first direction; and
   a coil spring urging translation of the base with respect to the slide in the second direction.

* * * * *